US006196076B1

(12) United States Patent
Chung

(10) Patent No.: US 6,196,076 B1
(45) Date of Patent: Mar. 6, 2001

(54) KNOB SWITCH DEVICE

(76) Inventor: Lee Hsin-Chih Chung, No. 21-8, Shang San Cho Woo, Wuchang-Li, ChungLi City, Taoyuan Hsien (TW)

( * ) Notice: Subject to any disclaimer, the term of this patent is extended or adjusted under 35 U.S.C. 154(b) by 0 days.

(21) Appl. No.: 09/182,710

(22) Filed: Oct. 29, 1998

(51) Int. Cl.[7] .............................. F16H 21/06; F16H 21/16

(52) U.S. Cl. .............................. 74/22 A; 173/47; 475/175

(58) Field of Search .............................. 74/22 R, 22 A; 173/47, 48; 475/175, 179

(56) References Cited

U.S. PATENT DOCUMENTS

| | | | | |
|---|---|---|---|---|
| 628,094 | * | 7/1899 | Hooper | 475/175 |
| 3,835,715 | * | 9/1974 | Howell | 74/22 R |
| 4,158,313 | * | 6/1979 | Smith | 74/22 A |
| 4,229,981 | * | 10/1980 | Macky | 74/22 A X |
| 5,451,127 | * | 9/1995 | Chung | 173/47 X |

* cited by examiner

*Primary Examiner*—Allan D. Herrmann
(74) *Attorney, Agent, or Firm*—Ostrolenk, Faber, Gerb & Soffen, LLP

(57) ABSTRACT

A kind of knob switch device relates to a clutch control device setting inside the decreasing box, and relates to a switch device setting outside the decreasing box. The clutch control device comprises the switch block, the switch set, the vibration block and the vibration set on the output shaft serially. The switch device comprises a stop ring, a stop board and a gyrator ring. With rotating the knob, we can drive the stop ring and the gyrator ring to rotate at the same time. Then it makes the screw orbit of the stop ring to push the jut of the stop board. When the clutch transits the device and makes the turning ring to rotate for a fixed angle, and it makes the knob, the inner gear and the turning ring to rotate at the same time. Then the switch block fits the switch teeth and makes the teeth of the vibration block to fit the teeth of the vibration set and make the output draft to have action of vibration at rotating time. When we keep on rotating forward or backward, the output shaft resumes to rotate without the action of vibration.

3 Claims, 3 Drawing Sheets

KNOB SWITCH DEVICE

FIELD OF THE INVENTION

The present invention is related to an electrical rotatively-driven hand tool and in particular to a knob switch device adapted in the hand tool, especially a knob that is capable of 360° rotation to switch between the simplex rotation and the rotation with vibration.

BACKGROUND OF THE INVENTION

Conventionally, electrical tools that drive a screwdriver or a drill bit can only rotates. For the reason that the screw driver or the drill bit may get stuck in the material of the work pieces the electrical tool is made to be switchable between simple rotation and rotation with vibration which allows the tool to work more effective and efficiently by combining rotation and axial vibration.

The prior art electrical tool capable of rotating with vibration comprises an impress ring of a steel ball, a spring, and a stop ring sequentially fit over a canister. The spring is seated between the stop ring and the impress ring of the steel ball. Plural teeth are formed on the top of the canister. Springs, a switch set, a vibration block and a vibration set are sequentially fit over an output shaft. Teeth are formed on both the vibration block and the vibration set and are engageable with each others The stop ring is fixed on the knob. With control juts formed on the back end of the electrical tool pushing the switch set, the teeth of the vibration block and the teeth of the vibration set are controlled to engage or to separate. When the teeth engage each other, the vibration set is fixed and the vibration block rotates with the rotation of the output shaft. This causes the output shaft to rotate with axial vibration. When the teeth of the vibration block and the teeth of the vibration set separate, the output shaft can only rotate without vibration.

The above prior art structure of the electrical tools, which can be switched between simple rotation and rotation with vibration, utilizes the jut eccentrically formed on the stop ring to push the switch set. When the stop ring rotates, the spring set on the jut drives the switch set to move axially. Further, it controls the vibration block and the vibration set to engage each other, which causes the axial vibration. Therefore, when the stop ring rotates, the single jut works in the eccentric position of the switch set and the rotation is only allowed in one direction. The movement of the switch set in the axial direction is unstable and the precision of switching operation is poor. Thus, the present invention intends to improve the prior art design of the electrical tool which is capable of switching between simple rotation and rotation with vibration.

SUMMARY OF THE INVENTION

The main object of the present invention is to provide a knob switch device to be adapted in an electrical rotatively-driven hand tool, which is capable of rotating over 360° in order to switch between simply rotating and rotating with vibration.

Another object of the present invention is to provide a knob switch device, which allows the switch set moving axially to push the vibration block in a more stable manner. The knob switch is rotatable in either direction to perform the switching operation. Thus a high precision and convenient switching operation is obtained.

The present invention provides a knob switch device comprising a clutch control device, which is arranged inside an inner casing and a switch device, which is arranged outside the inner casing. The clutch control device comprises a switch block, a switch set, a vibration block and a vibration set which are sequentially fit over an output shaft. Teeth, which are engageable with each other, are formed on the switch block and the switch set. Further teeth, which are engageable with each other, are formed on the vibration block and the vibration set. The switch device comprises a stop ring, a stop board and a gyrator ring. The stop ring is rotatable with respect to the inner casing. The stop board is only allowed to move axially on the inner casing. By means of biasing force caused by a biasing element, arc sections on the stop board are caused to engage arc sections on the stop ring. A clutch member is movably arranged on the stop board. A knob is fit over and fixed to the gyrator ring and the stop ring, which are manually rotated by rotating the knob. The gyrator ring has a circular inner circumference and a recess of a predetermined length along the circumferential direction is formed on the circular inner circumference. A turning ring is set on the switch block and having plural holes which are lined along the turning ring. An inward-toothed ring is set on the gyrator ring comprising plural axially extending cylindrical posts having a radius smaller than the radius of the hole receivable into the holes. The inward-toothed ring has teeth formed on an inner circumference, which has a fixed eccentricity. An outward-toothed ring is in the inward-toothed ring. The amount of the teeth of the outward-toothed ring is less than the amount of the teeth of the outward ring and is engageable with each other. The clutch extends out of the central hole of the gyrator ring and engages one of the teeth of the outward-toothed ring to fix the outward-toothed ring and prevent the outward-toothed ring from rotating so as to form a speed reduction device. By rotating the knob, the stop ring and the gyrator ring are rotated at the same time. It makes the arc sections of the stop ring push the jut of the stop board and the stop board moves axially to drive the inward-toothed ring. When the clutch is moved into the recess of the inner circumference of the gyrator ring and separates from the outward-toothed ring, it will lead in releasing the clutch. And it makes the knob, the inward-toothed ring and the turning ring rotate at the same time. By having the clutch moved out of the recess, the gyrator ring rotates and makes the clutch to be seated in the inner circumference, which fixes the outward-toothed ring again and resumes the speed reduction function, and it drives the switch block to rotate. Then the switch block fits the switch teeth and makes the teeth of the vibration block to fit the teeth of the vibration set and make the output draft to have action of vibration at rotating time. When the knob is rotated forward or backward, the output shaft resumes to rotate without the action of vibration.

BRIEF DESCRIPTION OF THE DRAWINGS

The present invention will be better understood from the following description of a preferred embodiment of the present invention, with reference to the attached drawing, wherein.

DETAILED DESCRIPTION OF THE PREFERRED EMBODIMENT

Figure 1:
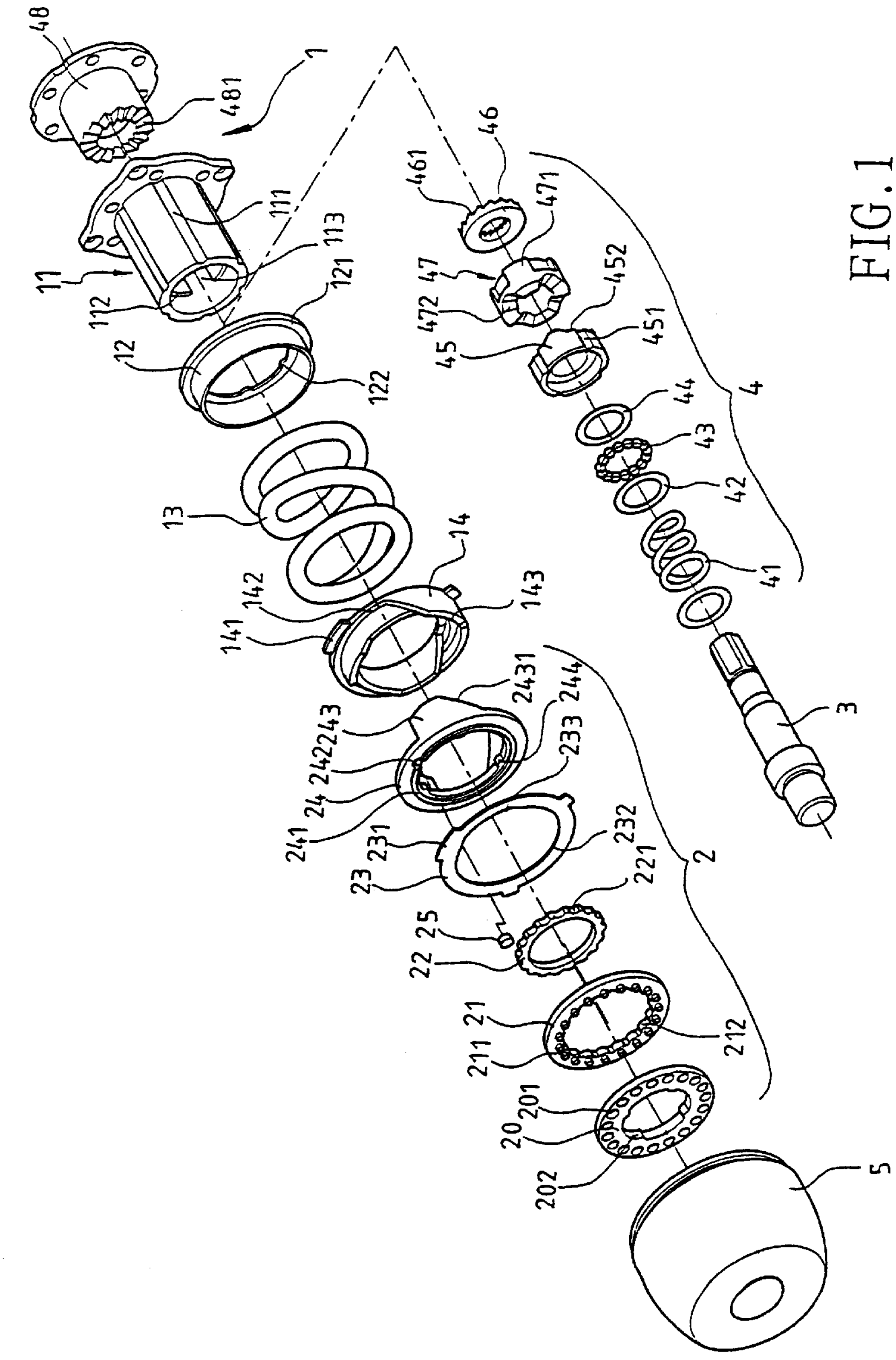
FIG. 1 is an exploded perspective view showing a knob switch device in accordance with the present invention.
Figure 3:
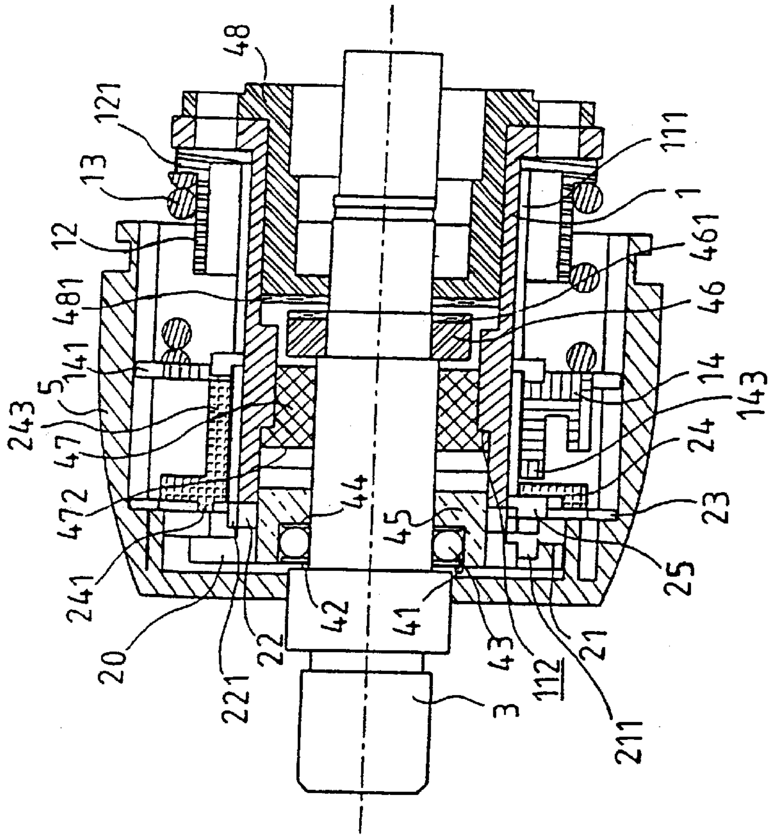
FIG. 3 is a cross-sectional view showing the knob in FIG. 2 in a switched condition.
Figure 2:
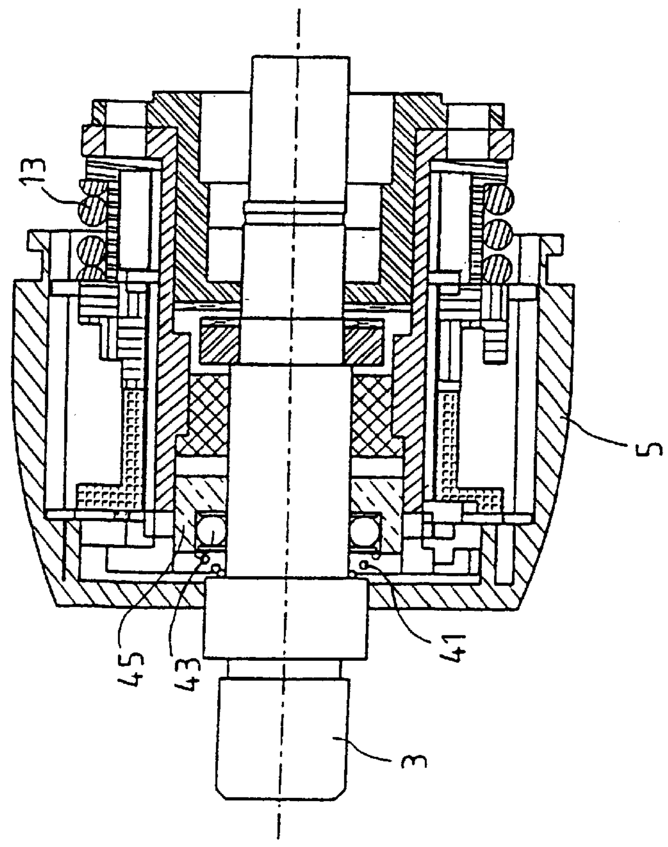
FIG. 2 is a cross-sectional view showing the knob, which is not switched.

With reference to FIGS. 1 and 2, a knob switch device in accordance with the present invention is shown, comprising an inner casing 1 comprising a hollow, cylindrical canister 11. The canister 11 has an inner, circumferential shoulder 112 formed in forepart of the inner radius with plural axial grooves 113 formed thereon. The canister 11 has plural axial slots 111 formed on an outside surface. A fixing member 48 comprises a cylindrical section received into a rear end of the inner casing 1 and fixed to the inner casing. Teeth 481 are formed on an axial front end of the fixing member 48. A press ring 12, a spring 13, and a stop ring 14 are sequentially fit over the outer radius of the canister 11 of the inner casing 1 and supported on a circumferential flange of the inner casing 1. The press ring 12 has a circumferential flange 121 on the rear end, and plural juts 122 on its inner surface. The juts 122 correspond in position and number to the slots 111 of the inner casing 1 so as to be receivable into the slots 111, which makes the press ring 12 not rotatable with respect to the canister 11. The spring 13 is fit over the canister 11 and supported on the flange 121 of the press ring 12. The stop ring 14 has a plurality of outward-protruding pieces 141 and three circumferentially extending arc sections. The three arc sections have different radii and define three continuous paths having unequal heights. Each path has a low section 142 and a high section 143 of different height. The inner radius of the stop ring 14 is fit over the outer radius of the canister 11 and engages the spring 13. The stop ring 14 is allowed to rotate relative to the canister 11. An output shaft 3 is received in the inner casing 1. A spring 41, a washer 42, plural steel balls 43, a washer 44, a switch block 45, a switch set 47 and a vibration block 46 are sequentially fit over the output shaft 3. The vibration block is secured on the shaft 3 to rotate therewith. The vibration block 46 has teeth 461, which are engageable with the teeth 481 of the fixing member 48. The vibration block 46 is fully received into the inner casing 1 with the teeth 461 thereof engaging the teeth 481 of the fixing member 48. The switch set 47 has a plurality of radially extending blocks 471 spaced circumferentially to be receivable into the grooves 1 of the inner casing 1 and switch teeth 472 formed on front end of the switch set 47. When the switch set 47 is fit into the inner casing 1, the switch set 47 engages and is supported on the shoulder 112 of the inner casing 1. This makes the blocks 471 engage with the grooves 113 to prevent the switch set 47 from rotating inside the inner casing 1. The vibration block 46 fits the front hole of the inner casing 1. The switch block 45 has switch teeth 452 engageable with the switch teeth 472 of the switch set 47 and plural jags 451 are formed on outside surface of the switch block 45. The two washers 42 and 44 are arranged on two sides of the plural steel balls 43 to define a bearing received in a recess formed on the switch set 45. The spring 41 is disposed between the bearing, particular the washer 42 thereof, and a circumferential shoulder of the output shaft 3. The spring force of the spring 41 keeps the switch teeth 452 of the switch block 45 engaging with the switch teeth 472 of the switch set 47.

The present invention has a switch device 2 in the front-end of the inner casing 1. The switch device 2 comprises a stop board 24, a gyrator ring 23, an outward-toothed ring 22 having a plurality of teeth 221 on an outer circumference thereof, an inward-toothed ring 21 having a plurality of teeth 211 on an inner circumference thereof to be engageable with the teeth 221 of the outward-toothed ring 22, a turning ring 20, a clutch 25 and a knob 5. The stop board 24 has a convex ring 241. The inner radius of the stop board 24 just engages the outer radius of the canister 11. The convex ring 241 has a notch 242. The stop board 24 has three arc sections 243, which engage the three arc sections of the stop ring 14. The stop board 24 has plural lead blocks 244 formed on an inner surface thereof, which corresponding to and are receivable in the slots 111 of the inner casing 1. With the lead blocks 244 fitting into the slots 111 of the canister 11, the stop board 24 is not allowed to rotate relative to the canister 11. The gyrator ring 23 has plural radially extending convex pieces 231 on the outer circumference and the gyrator ring 23 has an inner circular circumference 232. The inner circumference 232 has a recess 233, whose radius is bigger than the radius of the circumference 232. The gyrator ring 23 is fit over the convex ring 241 of the stop board 24 and is allowed to rotate freely. A clutch piece 25 is set on the notch 242 of the stop board 24 and extends out of the inner circumference 232 of the gyrator ring 23. The turning ring 20 is a circular plate, comprising plural holes 201, preferably equally spaced along the turning ring 20. Plural juts 202, which are corresponding to the jags 451 of the switch block 45, are formed on the turning ring 20. When the turning ring 20 is fit over the outer radius of the switch block 45, the juts 202 are received into the jags 451 which makes the turning ring 20 rotatable in unison with the switch block 45. The inward-toothed ring 21 has plural axially extending posts 211 lined along the circular plate. The outer radius of the posts 211 is smaller than the inner radius of the holes 201 of the turning ring 20. (Preferably the inner radius of the holes 201 is that of the posts 211 plus twice the eccentricity of the inward-toothed ring). The posts 211 of the inward-toothed ring 21 are receivable into the holes 201 of the turning ring 20. The number of the teeth of the outward-toothed ring 22 is one teeth lesser than the number of the teeth of the inward-toothed ring 21. Preferably, the number of the teeth of the outward-toothed ring 22 is eighteen (18) and the number of the teeth of the inward-toothed ring 21 is nineteen (19), the speed reduction ratio being 1:19.) When the outward-toothed ring 22 is received into the inward-toothed ring 21, the teeth 221 engage the teeth 212 of the inward-toothed ring 21.

Figure 4:
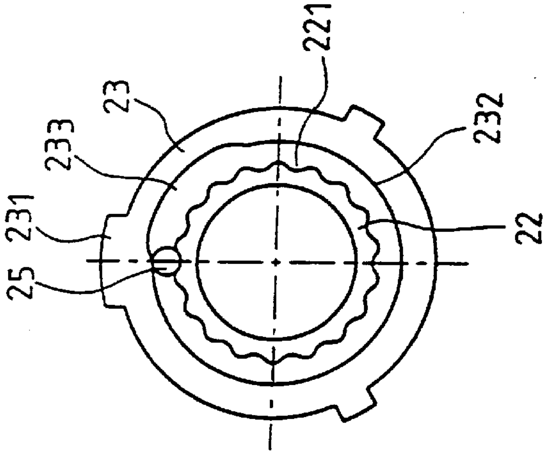
FIG. 4 is a plan view showing the clutch of the present invention located in the inner circumference of the gyrator ring and engaging the outward-toothed ring.

A knob 5 is fit over and covers the switch device 2 with the stop ring 14 and the gyrator ring 23 fixed to inside surface of the knob 5. With reference to FIG. 4, the clutch 25 is located between the inner circumference 232 of the gyrator ring 23 and the one of the teeth 221 of the outward-toothed ring 22. By rotating the knob 5, the stop ring 14 and the gyrator ring 23 are rotated at the same time, and it makes the jut 243 of the stop board 24 move along the path defined by the arc sections of the stop ring 14 from the low section 142 to the high section 143, or from the high section 143 to the low section 142, which compresses the spring 13 to adjust the torque of the output shaft 3. Because the outward-toothed ring 22 is locked by the clutch piece 25, the inward-toothed ring 21 and the turning ring 20 rotate in a speed-reduced condition. In the mean time, the switch teeth 452 of the switch block 45 do not engage the switch teeth 472 of the switch set 47 which compresses the spring 41 to separate the teeth 461 of the vibration block 46 from the teeth 481 of the vibration set 48 (with reference to the FIG. 2). That rotates the output shaft 3 without axial vibration.

Figure 6:
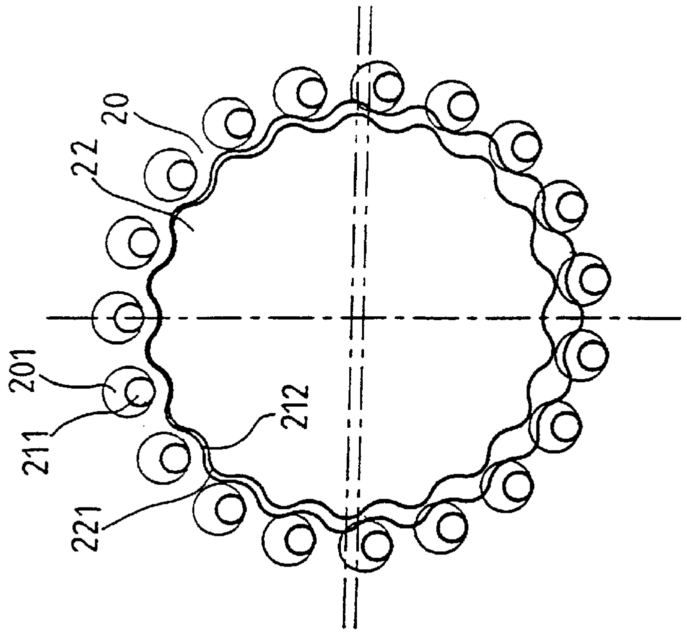
FIG. 6 is a plane view showing the posts of the inward-toothed ring in accordance with the present invention received in the holes of the turning ring.
Figure 5:
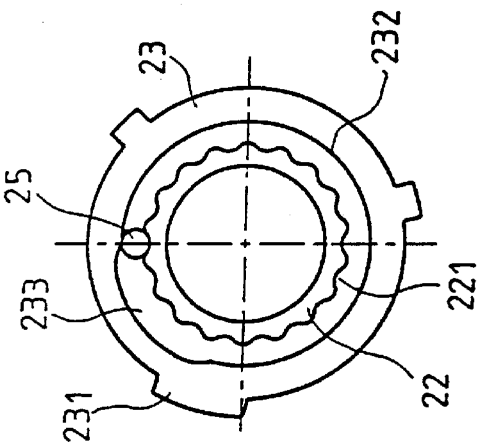
FIG. 5 is a plan view showing the gyrator ring shown in FIG. 4 rotated to have the clutch move to the position of the recess of the inner circumference of the gyrator ring.

To have the output shaft 3 rotate with axial vibration, the knob 5 is rotated clockwise to rotate the stop ring 14 and the gyrator ring 23 at the same time. The clutch 25 moves into the recess 233, which allows the outward-toothed ring 22 to rotate freely. During the process of rotating the knob 5, the outward-toothed ring 22 drives the inward-toothed ring 21 to rotate which in turn drives the turning ring 20 to rotate (with reference to FIG. 6). The turning ring 20 drives the switch block 45 to rotate which makes the teeth 452 of the switch block 45 drive the teeth 472 of the switch set 47 which in turn drives the vibration block 46 to move axially and engage the teeth 481 of the vibration set 48. This makes the teeth 461 of the vibration block 46 and the teeth 481 of the vibration set 48 jumping with the action of the axial vibration.

To recover the original simple rotation, the knob 5 is rotated again to rotate the stop ring 14 and gyrator ring 23 at the same time. Then, when the clutch 25 engages between the outward-toothed ring 22 and the inward-toothed ring 21, the outward-toothed ring 22, the inward-toothed ring 21 and the turning ring 20 are fixed together and not allowed rotate. In the mean time, the switch set 47 compresses the spring 41 and the vibration block 46 moves forward to separate from the vibration set 48 so as to cause the output shaft 3 to recover rotating without vibration.

While this invention has been depicted and described with reference to the preferred embodiment, it will be understood by those skilled in the art that modifications and changes may be made therein while retaining the spirit and scope of the invention. It is therefore intended that the following claims include all such changes and modifications that include the true spirit and scope of the invention.

What is claimed is:

1. A knob switch device comprising:

an inner casing having a canister with a circumference, a plurality of teeth on the circumference of the canister;

a press ring fit over the canister;

a spring disposed for urging the press ring toward the canister of the inner casing;

a stop ring engaging the canister and being freely rotatable on the canister;

a switch set and a switch block both fit over the canister and both comprising respective teeth thereon to be engageable with each other and also disengageable;

a vibration block comprising teeth on one end, and being fit into the inner casing, and a fixing member having teeth on one end, the fixing member being fit in the inner casing, the teeth of the vibration block and of the vibration set correspond to each other and the teeth of the vibration block are engageable with the teeth of the fixing member;

an output shaft over which a spring, the switch set, the switch block, the vibration block, and the fixing member are sequentially fit, the output shaft being received in the canister of the inner casing, a stop ring having a plurality of arc sections of unequal inner radii, each defining continuous paths having different heights, the stop ring being fit over the canister of the inner casing and freely rotatable thereon;

a switch device set on the top end of the stop ring comprising:

a stop board comprising a convex ring having an inner radius fit over the canister of the inner casing, the convex ring having a notch formed thereon, the stop board comprising a plurality of arc sections engageable with the paths defined by the arc sections of the stop ring;

a gyrator ring having a circular inner circumference having a recess, the recess having a radius greater than radius of the circular inner circumference;

a pin-like clutch disposed in the notch of the stop board;

a turning ring, which is a circular shape disk having plural holes lined along the circular shape of the turning ring, the turning ring being drivingly coupled to the switch block;

an inward-toothed ring comprising a circular disk having plural posts lined circularly, the posts having a radius smaller than radius of the holes of the turning ring and received in the holes of the turning ring;

an outward-toothed ring having plural teeth on an outer circumference, the number of the teeth of the outward-toothed ring being one tooth lesser than the teeth of the inward-toothed ring outward-toothed ring and being received in the inward-toothed ring with the teeth engaging each other in an eccentric manner; and a knob covering the stop ring and the gyrator ring the knob allowing a rotation of 360° to switch the clutch between the switch block and switch set, and thus making the output shaft to be switched between simple rotation and rotation with vibration.

2. The knob switch device as claimed in claim 1, wherein the canister of the inner casing comprising a plurality of slots formed on an outside surface and the stop board comprising a plurality of lead blocks engageable with the slots.

3. The knob switch device as claimed in claim 1, wherein the switch block comprises plural jags on an outside surface and the turning ring comprises plural axial juts received in the jags of the gyrator ring to form the driving coupling therebetween.

* * * * *